H. A. DUC, Jr.
APPARATUS FOR PRODUCING AND UTILIZING STEAM.
APPLICATION FILED OCT. 23, 1912.
1,186,298.
Patented June 6, 1916.
2 SHEETS—SHEET 1.
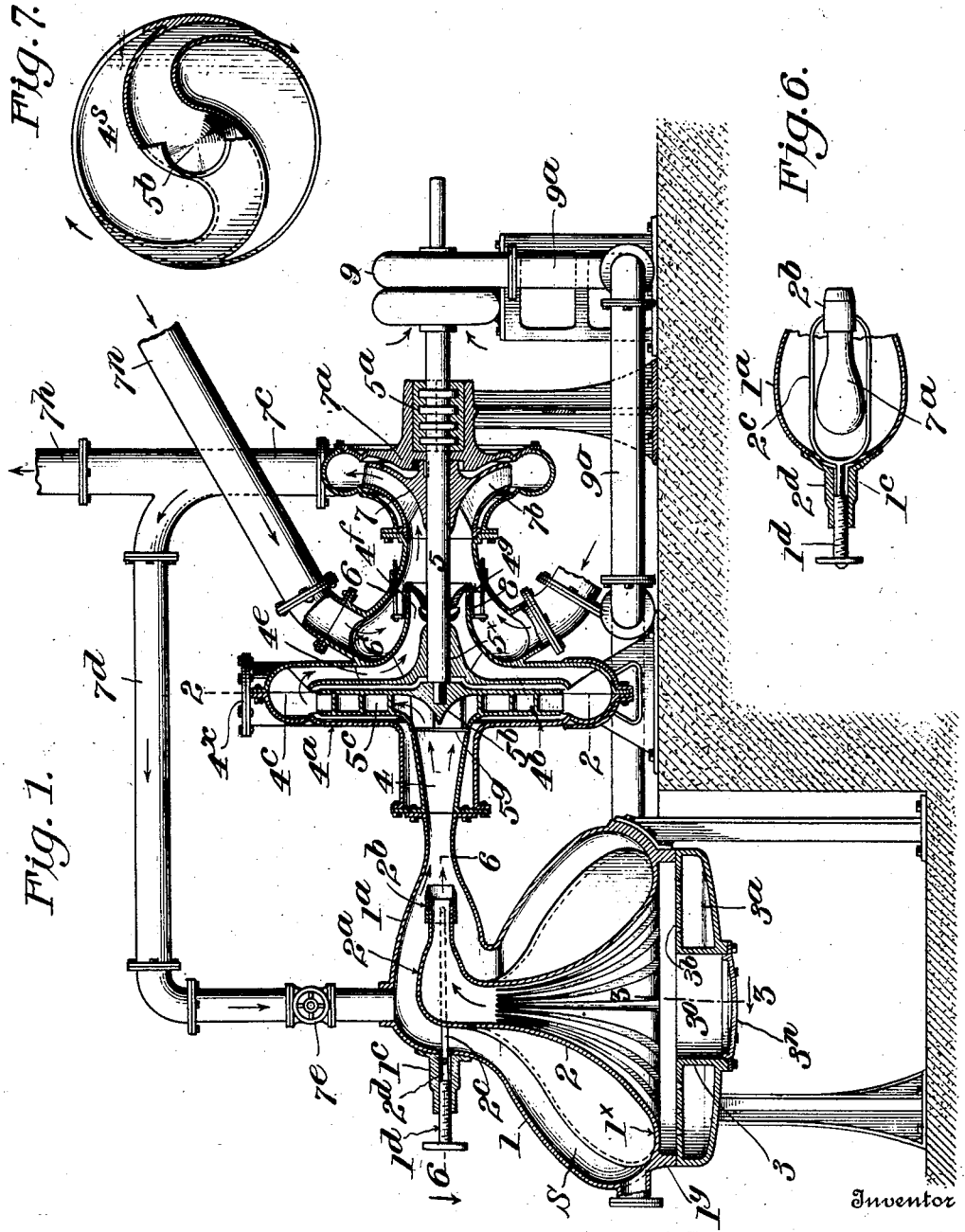
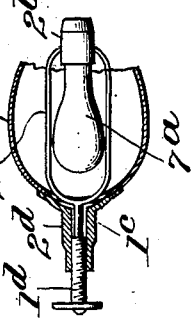
Inventor
Henry A. Duc Jr
Witnesses

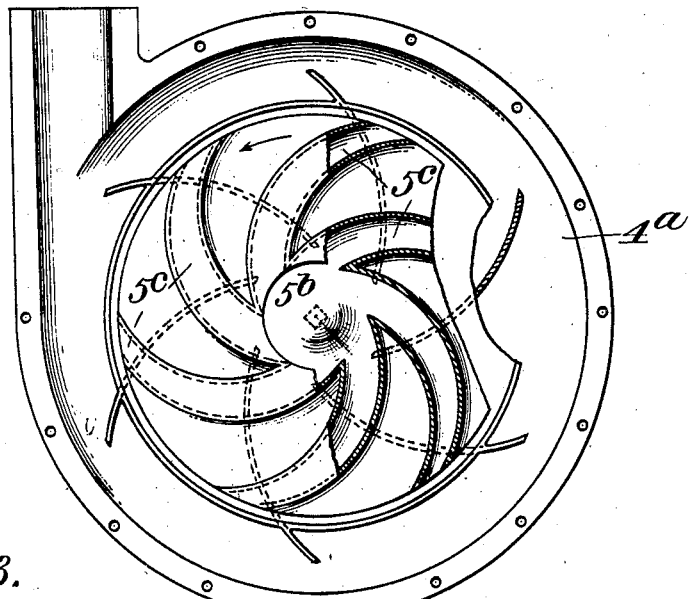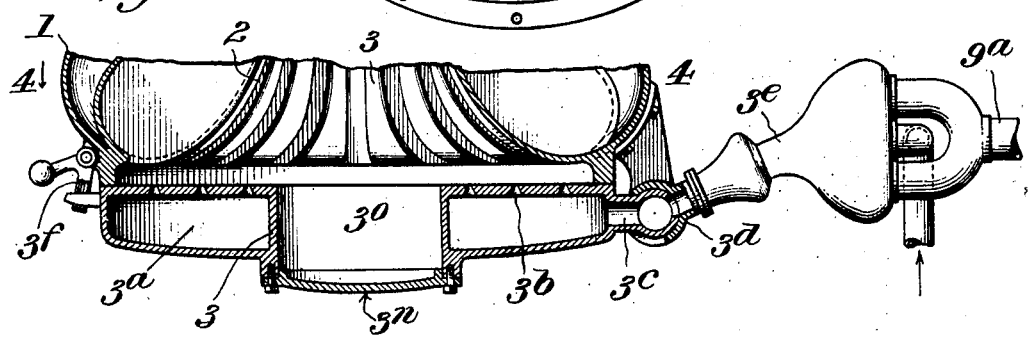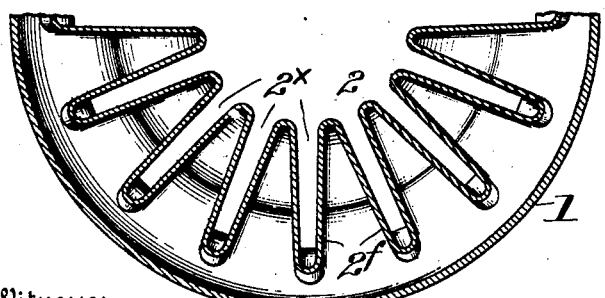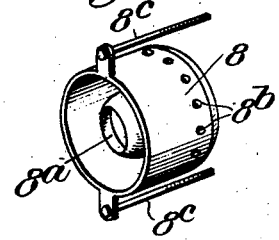

UNITED STATES PATENT OFFICE.

HENRY A. DUC, JR., OF CHARLESTON, SOUTH CAROLINA.

APPARATUS FOR PRODUCING AND UTILIZING STEAM.

1,186,298.  Specification of Letters Patent.  Patented June 6, 1916.

Application filed October 23, 1912. Serial No. 727,420.

*To all whom it may concern:*

Be it known that I, HENRY A. DUC, Jr., of Charleston, in the county of Charleston and State of South Carolina, have invented certain new and useful Improvements in Apparatus for Producing and Utilizing Steam; and I hereby declare that the following is a full, clear, and exact description thereof, reference being had to the accompanying drawings, which form part of this specification.

This invention is a novel apparatus for producing and utilizing steam.

The object of this invention is to convert water into steam by forcing the products of combustion from a suitable generator directly into a continuously formed tubular body of water produced by a stream of water passing around a nozzle from which the products of combination are emitted, the products entering with the water and instantly heating it and the hot water being then directed into suitably constructed mechanism capacitated to convert the hot water or steam into kinetic energy, and to utilize a part of the energy produced to accelerate the combustion and intensify the heat, whenever needed, to increase the steam forming power of the system; all without any waste of heat, such as necessarily occurs in the common type of forced-draft-boiler-furnaces.

A further object is to provide an apparatus which makes steam in close proximity to the resistance to be overcome, or the work to be done by the employment of steam, so that the usual waste, (due to radiation, condensation, frictional hindrance) in ordinary apparatus will be avoided.

A still further object is to furnish a system by which steam can be instantaneously produced, or hot water supplied without pressure on the vessel holding the water which is to be converted into steam.

I will explain the invention in connection with the accompanying drawings which illustrate one apparatus embodying the invention.

In said drawings—Figure 1 is a longitudinal sectional elevation of the complete apparatus embodying the invention. Fig. 2 is an enlarged vertical transverse section on line 2—2, Fig. 1. Fig. 3 is an enlarged section on line 3—3, Fig. 1. Fig. 4 is a detail section on line 4—4, Fig. 3. Fig. 5 is an enlarged perspective of one of the valves. Fig. 6 is a detail sectional view on line 6—6, Fig. 1. Fig. 7 shows a modified form of the turbine rotor.

As shown, the generator proper comprises a retort-shaped outer wall 1, the bottom of which is bent inwardly and upwardly, and a smaller retort-shaped wall 2 located within the wall 1, said walls being connected at their lower ends by a common annular bottom portion $1^x$, a comparatively narrow water-space between the inner and outer walls 1 and 2 of this retort-shaped generator S being left.

The upper contracted end $1^a$ of the outer wall of the generator is bent at right angles and connected with an expanding nozzle-shaped pipe 4, hereinafter referred to; while the upper nozzle-shaped end $2^a$ of the inner wall 2 is bent like the part $1^a$ and terminates within the latter in position to discharge any matters rising through this hollow wall 2 axially into a current of water flowing outward through the nozzle-shaped end $1^a$.

On the extremity of part $2^a$ may be fitted a slidable tube $2^b$ which is preferably tapered on its outer end but can be adjusted so as to form a thin narrow annular space between the outer wall of tube $2^b$ and the inner surface of the end $1^a$ of the wall 1. This tube $2^b$ may be adjusted to close, or regulate the width of the said annular passage, by means of links $2^c$ connected to a stem $2^d$ which passes through a hollow screw $1^d$ tapped into a bushing $1^e$ attached to the wall 1, the stem $2^d$ being rotatably immovable but longitudinally movably connected (in any suitable way) to the screw $1^d$ so that by turning said screw the sleeve $2^b$ can be adjusted longitudinally on the part $2^a$. Any other suitable means may be used for adjusting the sleeve.

Preferably the inner wall 2 of the generator is provided with numerous radially and longitudinally disposed return bends $2^z$, as shown in Figs. 1, 3 and 4, which return bends greatly increase the heating surface of said wall 2 and also form interior radial passages which are adapted to direct the products of combustion upwardly and inwardly toward the head $2^a$. The advantages of this construction are hereinafter set forth. In some cases instead of channeling the inner wall of the vessel, a fire brick might line the inside wall and have the converging recesses formed to concentrate the heat in the neck.

The generator is provided with a bottom flange 1ʸ which is adapted to fit closely against the upper side of a hollow cylindrical burner head 3; which is shown as provided with an annular chamber 3ᵃ from which the burning gases escape, through jet openings 3ᵇ in the upper side of the plate, into the chamber formed within the wall 2 of the generator. The burner head may be supplied with combustible gases in any desired way. As shown in Fig. 3 (which is a section taken at right angles to Fig. 1) the burner head 3 is provided with a hollow trunnion 3ᶜ by which it is hingedly suspended on the generator, said trunnion being mounted in a hollow bearing 3ᵈ which in turn connects with a gas and air mixing device 3ᵉ, from which suitable gaseous mixtures are supplied to the burner. The burner head 3 may be held in closed position by means of a catch 3ᶠ fitted to the casing as shown in Fig. 3, or in any other suitable manner. The construction is such that when the burner head is closed and gas is admitted thereinto, the burning gases will escape therefrom into or under the generator and will pass thence through the interior wall 2 to the head 2ᵃ, and thence escape through the sleeve 2ᵇ into the head 1ᵃ; and pass thence into the expanding pipe 4.

The pipe 4 is attached to or projects axially within a casing 4ᵃ containing a turbine wheel or rotor 4ᵇ, which is axially mounted upon a shaft 5 journaled in suitable bearings 5ᵃ on the casing of the machine; and in a bearing 5ˣ in the turbine casing as shown. The turbine casing is provided exterior to the rotor with a peripheral annular chamber 4ᶜ into which the rotor discharges; and at the side opposite the pipe 4 the casing is provided with converging passages 4ᵉ which lead to an axially disposed outlet 4ᶠ, which is hereinafter referred to.

The rotor is preferably provided at a point opposite the pipe 4 with a distributing cone-shaped surface 5ᵇ, from which radiate convolutely curved passages 5ᶜ which are larger at their inner ends and of less diameter than their outer ends. The inner end of the pipe 4 lies closely adjacent the central opening in the face of the rotor and is adapted to discharge all the fluid into such turbine wheel. The main body of the fluid enters the radially disposed passages in the rotor and acts, as hereinafter described, to impart a rotary motion to the rotor and shaft 5.

The discharge end 4ᶠ of the turbine casing is provided with a series of radially disposed openings 4ᵍ through which the fluids pass from the turbine casing into a conical casing 6 by which they pass on into a centrifugal pump casing 7ᵃ in which is a centrifugal pump piston 7 provided with radial passages 7ᵇ; the said piston 7 is fast to the shaft 5 and supported thereby and therefore turns with the turbine rotor. The outlet of the pump casing is connected with a pipe 7ᶜ which in turn is connected by a pipe 7ᵈ to the top of the generator 1; said pipe being provided with a valve 7ᵉ to regulate the flow of fluid into the generator. Water may be supplied to the pump casing 7ᵃ by means of a pipe or pipes 7ⁿ which connect with the casing 6 connecting the turbine and pump casings and forming a conical chamber 6ˣ around the outlet portion 4ᶠ of the turbine. Mounted upon the conical portion 4ᶠ within this conical chamber 6ˣ may be a cylindric valve 8, see Figs. 1 and 5, provided with a central opening 8ᵃ for the passage of the shaft 5 and with an annular series of perforations 8ᵇ adapted to register with openings 4ᵍ in part 4ᶠ. This valve 8 may be adjusted by means of rods 8ᶜ attached thereto and projecting through openings in the casing; said rods being threaded so that by turning them the valve can be adjusted. Said valve 8 may be adjusted by any other suitable means.

The shaft 5 is preferably extended beyond and through the pump casing and may have on its outer end a fan or blower piston of any suitable kind within a blower casing 9 which may be used to produce a current of air, which air may be conducted through pipes 9ᵃ to the gas and air mixer 3ᵉ, see Fig. 3. The pipe 7ᶜ is preferably branched so that if the valve 7ᵉ be closed water may pass out through the branch 7ʰ of the pipe.

Fig. 7 shows a modified construction of the turbine rotor. As shown in this figure the rotor has a central opening to admit the cylindrical water-enveloped current of heat; and from this opening radiate two diametrically opposite reversely curved channels 4ˢ by which the heated current is diverted in opposite directions from the conical hub portion 5ᵇ and discharged at the periphery of the rotor as indicated by the arrows in the drawing, the steam escaping from the channels causing the rotor to turn in a direction opposite to the flow of the steam.

Operation: The sleeve 2ᵇ being moved by the screw 1ᵈ until it closes the throat in which it slides, the vessel and inlet pipe are filled with water and the gas lighted, which gas enters the water as it flows by moving the sleeve backward, and makes steam which rushes through the turbine 3ᶜ and rotates it and turns the pump which maintains the supply.

The hot gases generated in the burner 3 are ejected through the neck 2ᵃ and the tube 2ᵇ into the annular current of hot water flowing from the casing 1 toward the turbine; and all the hot gases are thus directly passed into a thin tubular sheet of water. Such a sheet of water is instantly heated and passes in an intensely hot and expansive condition toward the turbine rotor; the hot water or steam entering the channels of the rotor tends to pass outwardly to the chamber 4ᶜ and in so doing imparts by its reactive force rotary motion to the rotor, which through shaft 5 imparts rotary motion to the pump 7 and blower 9. The inflow of the hot liquid to the turbine is accelerated by a partial vacuum or suction caused by the cooling of the hot water, steam or vapor as it reaches the discharge 4ᵍ and comes into contact with the cooler water in the chamber 6ˣ, and is condensed in such water and passes therewith to the pump 7 by which it is circulated through the pipe 7ᶜ back to the casing 1. The amount of water which is transmitted to the casing can be regulated by the valve 7ᵉ; only sufficient water should be circulated to induce thorough heating and vaporization of all the water moving past the sleeve 2ᵇ toward the turbine.

The employment of a water-distributing and heat-concentrating vessel of the character shown in the drawing causes an annular stream of water to flow over a cylindrical flue through which hot gases are drawn by the induction of the current, (or in other words the hot gases flow into a tubular water column). The burner supplies all the products of combustion required to vaporize such annular stream of water. The generator does not and is not intended to perform the office of a steam boiler, the water therein being used to prevent over heating and becomes steam after entering the rotor channels.

The turbine casing can be connected with any of the well known water heaters to permit any excess of gases, products of combustion or other elastic matter to escape, instead of passing them directly into the pump, if the latter has to lift water any considerable height; but when it has water on its own level, or water is fed into the suction chamber from a higher head, the pump can readily handle any surplus gases and elastic fluids which may be discharged from the turbine.

The discharge from the rotor may in some cases be permitted to escape through an opening above the points 4ᶜ, this opening being at other times closed by a plate 4ˣ. When the plate 4ˣ is removed the sleeve which closes the annular passage can shut off all communication through the perforations with the pump and cause the entire discharge to be delivered through the opening 4ᶜ into any suitable condensing system elevated sufficiently to cause the condensed water to flow back into the vessel which mixes it with the heat in the annular cavity forming nozzle after the gaseous matter has escaped. Thus it will be seen that the apparatus may be arranged to discharge into a condenser, or into a pipe or radiator for heating purposes.

The channels 2ᶠ enable a large number of heat units to be liberated in the chamber, and as they pass through the converging recesses 4ᶠ with a high velocity an increase in temperature results and is utilized in heating the water while in other types of forced draft furnaces such force draft goes out of the stack instead of into the water for utilization.

When the apparatus is to be used as a water heater, or for a limited amount of power, the cap 3ⁿ over the central opening 3° in the burner head 3 may be removed, and the blower dispensed with. When a large amount of hot water is required, and the apparatus has to be forced, the cap is closed and the blower employed. In some cases the whole of the water delivered by the pump may be caused to pass through the vessel and be discharged from the discharge pipe, excepting the amount which escapes with the heat, for steam forming purposes. The apparatus may be adapted for many uses, where hot water, steam, or motion is required; and is operative in any position, with the same efficiency, and may burn oil where gas is not cheap.

What I claim is:

1. A generator for the purpose specified comprising outer and inner retort-shaped walls connected at bottom, the contracted end of the inner wall terminating within the contracted end of the outer wall, means for supplying water to the space between the walls, such water escaping in a thin annular sheet or spray from the contracted space between the end of the inner wall and the outer wall, and means for passing hot gases through the chamber formed by the inner wall and ejecting same into the annular sheet of water passing out between the contracted ends of the walls.

2. A generator for the purpose specified comprising outer and inner retort-shaped walls connected at bottom, the contracted head on the inner wall terminating within the contracted head of the outer wall, and the latter communicating with a discharge pipe; with means for supplying water to the space between the walls, such water escaping in a thin annular sheet or spray from the contracted space between the end of the inner wall and the outer wall, and means for passing hot gases through the chamber formed by the inner wall and ejecting same into the annular sheet of water passing out of the generator into said discharge pipe.

3. Apparatus for converting heat into motion comprising a paraboloidally shaped annular vessel having an internal wall converging into a curved neck which is curved substantially at right angles to the axis of the vessel, and concentric with a corresponding neck of the outer wall, which surrounds it, and is bent in the same direction so as to form an annular water space between the inner and outer conical necks.

4. Apparatus for converting heat into motion comprising a paraboloidally shaped annular vessel having external and internal walls, the internal wall converging into a curved neck which projects substantially at right angles to the axis of the vessel, and concentric with the outer wall, which surrounds it, and is curved in the same direction so as to form an annular space between the inner and outer conical sides; with means to supply hot gases to the chamber formed by the inner wall.

5. Apparatus for converting heat into motion comprising a paraboloidally shaped annular vessel having a smooth external surface, and an internal axially channeled surface provided with a series of converging grooves, and having a curved neck which projects substantially at right angles to the axis of the vessel and concentric with the outer wall which surrounds it, and is curved in like manner so as to form an annular space between the inner and outer conical sides.

6. Apparatus for converting heat into motion comprising a paraboloidally shaped annular vessel having a smooth external wall, and an internal converging wall having a series of narrowing grooves, and a curved neck which projects substantially at right angles to the axis of the vessel, the outer wall having a similar curved portion to form an annular space between the inner and outer walls; with means to supply hot gases to the chamber formed by the inner wall.

7. A generator for the purpose specified comprising outer and inner retort-shaped walls connected at bottom, and having contracted heads on their upper ends, the head of the outer wall communicating with an outlet pipe, means for supplying water to the space between the walls, the water escaping in a thin annular sheet or spray into the outlet pipe through the contracted space between the end of the inner wall and the outer wall, and means for passing hot gases through the chamber formed by the inner wall and ejecting same into said annular sheet of water at the end of the inner wall.

8. Apparatus for converting heat into motion comprising a paraboloidally shaped annular vessel having an internal wall converging into a curved neck which is curved substantially at right angles to the axis of the vessel, and concentric with a corresponding neck of the outer wall, which surrounds it, and is bent in the same direction so as to form an annular water space between the inner and outer conical necks; with a turbine casing communicating with the outlet of the generator, and a rotor in said casing.

9. In combination, means for admitting a current of hot products of combustion directly into a water spray to produce steam; of a turbine casing into which the mixture is discharged, and a rotor in said casing, with a pump casing communicating with the outlet of the turbine casing and concentric therewith; a rotor shaft disposed axially of said turbine and pump casings; a piston on said shaft within the pump casing, and pipes for taking fluid from the pump casing back to the generator.

10. In combination, means for admitting a current of hot products of combustion directly into a water spray to produce steam; a turbine casing into which the mixture is discharged, and a rotor in said casing; with a pump casing communicating with the outlet of the turbine casing; a blower beside the pump casing; a rotor shaft passing axially through the turbine, pump and blower casings; a piston on said shaft in the pump casing; and a fan on said shaft in the blower casing, substantially as described.

11. In combination, means for admitting a current of hot products of combustion directly into a water spray to produce steam; a turbine casing into which the mixture is discharged, and a rotor in said casing; with a pump casing communicating with the outlet of the turbine casing; a blower beside the pump casing; a rotor shaft passing axially through the turbine, pump and blower casings; a piston on said shaft in the pump casing; a fan on said shaft in the blower casing; means for conducting water from the pump casing to the generator; and means for directing air from the blower to the generator.

In testimony that I claim the foregoing as my own, I affix my signature in presence of two witnesses.

HENRY A. DUC, Jr.

Witnesses:
 JAMES R. MANSFIELD,
 L. E. WITHAM.